United States Patent
Feau et al.

(10) Patent No.: US 9,733,135 B2
(45) Date of Patent: Aug. 15, 2017

(54) METHOD AND DEVICE FOR AUTOMATICALLY DETECTING AN INCORRECT MEASUREMENT OF A TOTAL TEMPERATURE ON AN AIRCRAFT

(71) Applicant: AIRBUS OPERATIONS SAS, Toulouse (FR)

(72) Inventors: Julien Feau, Toulouse (FR); Xavier Bousquet, Cugnaux (FR)

(73) Assignee: Airbus Operations (SAS), Toulouse (FR)

(*) Notice: Subject to any disclaimer, the term of this patent is extended or adjusted under 35 U.S.C. 154(b) by 754 days.

(21) Appl. No.: 14/252,160

(22) Filed: Apr. 14, 2014

(65) Prior Publication Data

US 2015/0117487 A1 Apr. 30, 2015

(30) Foreign Application Priority Data

Apr. 16, 2013 (FR) .................................. 13 0053434

(51) Int. Cl.
*G01K 15/00* (2006.01)
*G05B 23/02* (2006.01)

(52) U.S. Cl.
CPC ....... *G01K 15/007* (2013.01); *G05B 23/0235* (2013.01)

(58) Field of Classification Search
None
See application file for complete search history.

(56) References Cited

U.S. PATENT DOCUMENTS

| 5,001,638 A | * | 3/1991 | Zimmerman | ........ G05D 1/0077 244/194 |
| 2005/0232331 A1 | * | 10/2005 | Severson | ............. G01K 13/028 374/128 |
| 2007/0130096 A1 | * | 6/2007 | Selvig | ........................ G01P 5/14 706/45 |
| 2009/0306927 A1 | * | 12/2009 | Brivet | .................. G01K 13/028 702/130 |
| 2012/0253559 A1 | | 10/2012 | Feau | |

FOREIGN PATENT DOCUMENTS

EP 1293784 A2 3/2003

OTHER PUBLICATIONS

French Search Report, dated Feb. 5, 2014.

* cited by examiner

Primary Examiner — Lisa Caputo
Assistant Examiner — Janice M Soto
(74) *Attorney, Agent, or Firm* — Greer, Burns & Crain, Ltd.

(57) ABSTRACT

A method and a device for automatically detecting an incorrect measurement of a total temperature on an aircraft. The detection device comprises several monitoring units configured to monitor the variations of the measured total temperature, provided by a temperature probe, and current values of the Mach number and of the altitude of the aircraft over a predetermined monitoring period of time, and a detection unit configured to detect an incorrect measurement of the total temperature when said monitoring units simultaneously detect particular conditions relative to said variations.

12 Claims, 2 Drawing Sheets

METHOD AND DEVICE FOR AUTOMATICALLY DETECTING AN INCORRECT MEASUREMENT OF A TOTAL TEMPERATURE ON AN AIRCRAFT

CROSS-REFERENCES TO RELATED APPLICATIONS

This application claims the benefit of the French patent application No. 20130053434 filed on Apr. 16, 2013, the entire disclosure of which is incorporated herein by reference.

BACKGROUND OF THE INVENTION

The present invention relates to a method and a device for automatically detecting an incorrect measurement of a total temperature on an aircraft.

It is known that an aircraft, in particular a transport airplane, uses temperature and pressure data, and notably the total temperature TAT (Total Air Temperature), which are measured by on-board air data probes, for a plurality of applications such as the calculation of the airspeed for control of the flight and for display in the cockpit, engine control and the management of the power of the engines, etc.

The management of the power of an engine is generally implemented by an electronic full authority digital engine control system of the FADEC (Full Authority Digital Engine Control) type, which is responsible for the control and monitoring of the engine with which it is associated. The FADEC system generally comprises a control computer of the EEC (Electronic Engine Control) type as its main computer. The control of the engines requires three air data parameters in order to regulate the appropriate thrust of the engine: the static pressure $P_s$, the total pressure $P_t$ and the total air temperature TAT of the air around the skin of the fuselage of the aircraft. These three air data parameters are used for calculating the following parameters: the standard altitude ISA, the Mach number $M_n$ and the temperature difference $\Delta$ISA between the current temperature and the standard temperature. A power management table is integrated in the EEC computer in order to provide the relationship between the ambient conditions (ISA, $M_n$, $\Delta$ISA) and the engine control parameter (N1, EPR, TPR) which is controlled by the EEC computer. The taking into account of an exact value for each of the three primary data parameters ($P_s$, $P_t$, TAT) is essential in order to be able to adjust the required thrust.

The total temperature is measured using a plurality of temperature probes arranged on the skin of the fuselage of the aircraft so as to measure the temperature of the airflow. These temperature probes comprise temperature-sensitive components which change resistance in response to temperature changes.

However, incorrect measurement of total temperature can appear when there is presence of frost or of ice crystals. It is known that icing is a meteorological phenomenon, the conditions for the appearance of which are related to the humidity and to the static temperature. Icing can have effects on the probes, which can be sufficient to degrade the measurement, sometimes making it incorrect (frozen or biased).

In order to solve this problem, the probes are heated in order to prevent such icing which can compromise their reliability.

Even though the deicing means are efficient, it is not possible to completely prevent cases of icing of some of the probes among the plurality of probes which equip an aircraft, for example in the case of incorrect operation of the deicing means or possibly in the presence of ice crystals.

It is therefore advantageous to be able to have means available on the aircraft making it possible to detect, in real time and in a reliable manner, any incorrect measurement of the total temperature provided by a temperature probe in the presence of icing conditions in order to prevent the systems of the aircraft from using such an incorrect measurement.

SUMMARY OF THE INVENTION

The present invention relates to a method for the automatic detection, on an aircraft and in particular on a transport airplane, of an incorrect measurement of a total temperature provided by a temperature probe.

In order to do this, according to the invention, said method comprises at least the following automatic steps, implemented repetitively and respectively comprising:

monitoring a measured total temperature, provided by a temperature probe of the aircraft, in order to be able to detect a first condition according to which an increase of said measured total temperature is greater than a predetermined threshold temperature over at least a first predetermined period of time;

monitoring the measured total temperature, provided by the temperature probe, in order to be able to detect a second condition according to which said total temperature at the end of an increase is situated within a first temperature range around 0° C.;

monitoring a received current altitude of the aircraft, in order to be able to detect a third condition according to which any variation of said current altitude over said first period of time remains below a predetermined altitude threshold;

monitoring a received current Mach number of the aircraft, in order to be able to detect a fourth condition according to which any variation of said current Mach number over said first period of time, remains less than a predetermined Mach number threshold; and, detecting an incorrect measurement of the total temperature when said first, second, third, and fourth conditions are met simultaneously.

Thus, due to the invention, by monitoring and analyzing the variation of the values of three parameters: of the measured total temperature provided by the temperature probe and of two other parameters of the aircraft (its current altitude and its current Mach number); a solution is available on board the aircraft making it possible to detect in real time, automatically and reliably, an incorrect measurement of the total temperature in the presence of icing conditions.

In the case of detection of such an incorrect measurement, the current measurement of total temperature by the temperature probe and the subsequent measurement taken by that temperature probe are declared invalid and are not taken into account by the systems of the aircraft.

In a preferred embodiment, said automatic detection method furthermore comprises an additional step of canceling a detection of an incorrect measurement of the total temperature, comprising monitoring said measured total temperature, in the case of detection of an incorrect measurement, in order to be able to detect a cancellation condition according to which the total temperature is situated outside of a second temperature range around 0° C. over at least a predetermined second period of time. Advantageously, said second temperature range corresponds to said first temperature range.

Moreover, advantageously:
  said first temperature range is between −10° C. and 1° C.;
  said temperature threshold is situated in a temperature range of between 8.5° C. and 11° C., and is preferably equal to 9.5° C.;
  said altitude threshold is situated in an altitude range of between 200 and 1000 feet, and is preferably equal to 500 feet;
  said Mach number threshold is situated in a Mach number range of between 0.02 and 0.2 and is preferably equal to 0.1; and,
  said predetermined first period of time is equal to 60 seconds.

The present invention also relates to a device for automatically detecting an incorrect measured total temperature on an aircraft, in particular on a transport airplane.

For this purpose, said device is noteworthy, according to the invention, in that it comprises at least:
  a first monitoring unit configured to automatically monitor a measured total temperature, provided by a temperature probe of the aircraft, in order to be able to detect a first condition according to which an increase of said measured total temperature is greater than a predetermined temperature threshold over at least a first predetermined period of time;
  a second monitoring unit configured to automatically monitor said measured total temperature, provided by the temperature probe, in order to be able to detect a second condition according to which said total temperature at the end of an increase is situated within a first temperature range around 0° C.;
  a third monitoring unit configured to automatically monitor a received current altitude of the aircraft, in order to be able to detect a third condition according to which any variation of said current altitude during said first period of time remains below a predetermined altitude threshold;
  a fourth monitoring unit configured to automatically monitor a received current Mach number of the aircraft, in order to be able to detect a fourth condition according to which any variation of said current Mach number over said first period of time, remains below a predetermined Mach number threshold; and
  a detection unit configured to automatically detect an incorrect measurement of the total temperature when said first, second, third, and fourth monitoring units simultaneously detect said first, second, third, and fourth conditions respectively.

In a preferred embodiment, said automatic detection device comprises moreover an auxiliary monitoring unit configured to monitor said measured total temperature (provided by the temperature probe), in the case of detection of an incorrect measurement by said detection unit, in order to be able to detect a cancellation condition, according to which the total temperature is situated outside of a second temperature range around 0° C. over at least a second predetermined period of time.

The present invention also relates to an aircraft system, in particular of the computer type, for example a control computer of the EEC (Electronic Engine Control) type or an air data inertial reference system of the ADC (Air Data Computer) type, which has access to current values (that is to say which receives or determines current values) respectively of total temperature, of Mach number and of altitude of the aircraft, this system comprising at least one device for automatically detecting an incorrect total temperature such as described above.

The present invention also relates to an aircraft, in particular a transport airplane, which comprises a device and a system such as those described above.

BRIEF DESCRIPTION OF THE DRAWINGS

The figures of the appended drawing will give a good understanding of how the invention may be embodied. In these figures, identical references denote similar elements.

DETAILED DESCRIPTION OF THE PRESENT INVENTION

Figure 1:
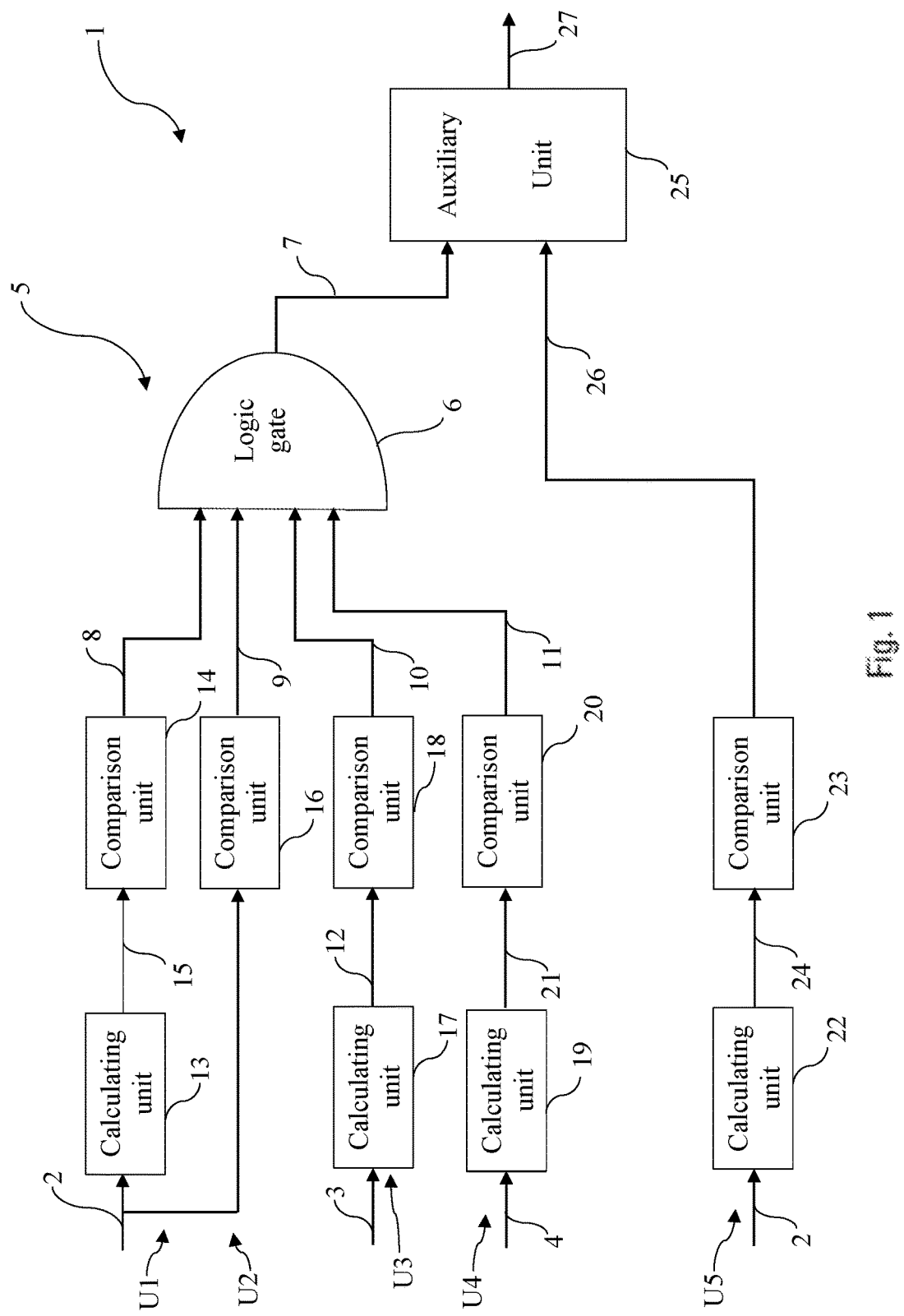
FIG. 1 is the block diagram of an automatic detection device which illustrates an embodiment of the invention.

The device 1 illustrating the invention and shown diagrammatically in FIG. 1 is intended to automatically detect an incorrect measurement of a total temperature of an aircraft, in particular of a transport airplane.

Figure 3:
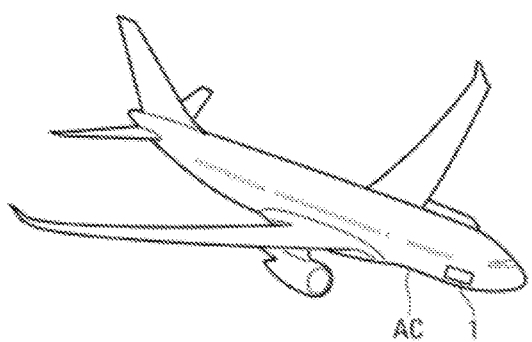
FIG. 3 is a front and side perspective view of an aircraft used in association with an embodiment of the present invention.

Said device 1 which is installed on the aircraft AC (as shown very diagrammatically in FIG. 3), is if the type comprising links 2, 3 and 4 for iteratively receiving from usual means current values of total temperature, Mach number and altitude respectively of the aircraft AC. The total temperature (of the TAT type) is measured by a usual probe for measuring total temperature (called a temperature probe), and the Mach number and the altitude are determined using usual means. They can be any means capable of determining the current values of the Mach number and the altitude of the aircraft AC.

According to the invention, said automatic detection device 1 furthermore comprises:
  a monitoring unit U1 which is configured to monitor a measured total temperature, received via the link 2 (from a temperature probe of the aircraft AC), in order to be able to detect a first condition corresponding to in increase (over a predetermined period of time T1) of said measured total temperature, which is greater than a predetermined temperature threshold SA;
  a monitoring unit U2 which is configured to monitor the received total temperature, received via the link 2, in order to be able to detect a second condition according to which said total temperature at the end of an increase is situated within a temperature range DA around 0° C.;
  a monitoring unit U3 which is configured to monitor a current altitude of the aircraft AC, received via the link 3, in order to be able to detect a third condition according to which any variation of said current altitude during said period of time T1 remains lower, in absolute value, than a predetermined altitude threshold SB;
  a monitoring unit U4 which is configured to monitor a current Mach number of the aircraft AC, received via the link 4, in order to be able to detect a fourth condition according to which any variation of said current Mach number during said period of time T1 remains lower, in absolute value, than a predetermined threshold (of the Mach number) SC; and,
  a detection unit 5 which is configured to detect an incorrect measurement of total temperature when said first to fourth monitoring units U1 to U4 simultaneously detect said first to fourth conditions respectively, and to transmit an item of information relative to a detection via a link 7.

Said detection unit 5 comprises a logic AND gate 6 which is connected by the intermediary of links 8 to 11 respectively to said monitoring units U1 to U4.

Thus, the automatic detection device 1 makes it possible to detect in real time, automatically and reliably, an incorrect measurement of the total temperature in the presence of icing conditions and does so by monitoring and analyzing the variation of the values of three parameters:

said measured total temperature and two other parameters of the aircraft AC (its altitude and its Mach number).

In a preferred embodiment:

said temperature range DA is included between −10° C. and 1° C.;

said temperature threshold SA is situated within a temperature range of between 8.5° C. and 11° C., and is preferably equal to 9.5° C.;

said altitude threshold SB is situated within an altitude range of between 200 and 1000 feet, and is preferably equal to 500 feet;

said (Mach number) threshold SC is situated in a range of between 0.02 and 0.2 and is preferably equal to 0.1; and, said period of time T1 used by the monitoring units is equal to 60 seconds.

It proves to be that a monitoring period of time T1 of 60 seconds is a good compromise, that is to say that it is not too short so as not to detect gradual icing situations and not too long so as to allow efficient detection.

As shown in FIG. 1, said monitoring unit U1 comprises:

a calculating unit 13 for calculating the difference between the total temperature TAT received at the current time and the total temperature TAT received at a time T1 before the current time; and, a comparison unit 14 which is connected by the intermediary of a link 15 to said calculating unit 13, which compares the difference (calculated by the latter) with said temperature threshold SA, and which transmits if appropriate (difference greater than SA), a value "1" to the logic gate 6, indicating the detection of the aforesaid first condition.

This monitoring unit U1 thus makes it possible to detect a sudden step change in the measured total temperature (preferably greater than 9.5° C.) which is characteristic of the icing of a probe.

Moreover, said monitoring unit U2 comprises a comparison unit 16 for comparing the total temperature at the end of an increase with said temperature range DA and which transmits, if appropriate (temperature situated within DA), a value "1" to the logic gate 6, indicating the detection of the aforesaid second condition.

The monitoring unit U2 therefore checks if the final temperature after the temperature step is actually situated within said temperature range DA, preferably between −10° C. and 1° C. In fact, usually in icing conditions, the temperature inside the probe drops into this range because of the heating of the ice/water mixture inside the probe, as has been confirmed by flight test data.

Moreover, said monitoring unit U3 comprises:

a calculating unit 17 for calculating the difference between the altitude of the aircraft at the current moment of time and its altitude at the time T1 before this current moment of time; and, a comparison unit 18 which is connected by the intermediary of a link 12 to said calculating unit 17, which compares the difference (calculated by the latter) in absolute value with said altitude threshold SB and which transmits, if appropriate (difference in absolute value less than SB), a value "1" to the logic gate 6, indicating the detection of the aforesaid third condition.

The monitoring unit U3 therefore monitors a possible variation (increasing or decreasing) of the altitude over the monitoring period of time T1, this variation having to remain less, in absolute value, than said threshold SB (preferably less than 500 feet) in order to avoid a false detection (of incorrect measurement) during a total temperature variation justified by the altitude variation, for example in the case of a rapid descent.

Moreover, said monitoring unit U4 comprises:

a calculating unit 19 for calculating the difference between the Mach number of the aircraft at the current moment of time and its Mach number at the time T1 before this current moment of time; and a comparison unit 20 which is connected by the intermediary of a link 21 to said calculating unit 19, for comparing this difference with said threshold SC and for transmitting, if appropriate (difference in absolute value less than SC), a value "1" to the logic gate 6, indicating the detection of the aforesaid fourth condition.

The monitoring unit U4 therefore monitors a possible variation (increase or decrease) of the Mach number during the monitoring period of time T1, this variation having to remain less in absolute value than said threshold SB (preferably than 0.1 Mach) in order to avoid a false detection (of incorrect measurement), because an increase of the Mach number can result in a large increase of the total temperature.

The device 1 thus makes it possible to monitor the measured total temperature in real time and to detect total temperature measurements that are incontestably incorrect, because of icing or of an accretion of frost on the temperature measuring probes, based on a concept of monitoring tendencies. Said detection unit 5 detects an incorrect measurement when it simultaneously receives four "1" values from said monitoring units U1 to U4.

In a preferred embodiment, said device 1 furthermore comprises, as shown in FIG. 1, an auxiliary monitoring unit U5 which is configured to monitor the measured total temperature, received via the link 2, in the case of detection of an incorrect measurement by said detection unit 5, in order to be able to detect a condition of cancellation of the incorrect measurement detection, that is to say a return to a valid measurement. This cancellation condition is met when the measured total temperature is situated out of the temperature range DB around 0° C. over at least a predetermined period of time T2, for example 180 seconds.

Said monitoring unit U5 comprises for this purpose:

a calculating unit 22 for calculating the difference between the total temperature TAT at the current moment of time and the total temperature TAT at the time T2 before the current moment of time; and, a comparison unit 23 which is connected by the intermediary of a link 24 to said calculating unit 22 and which compares the difference (calculated by the latter) with said temperature range DB, which detects a cancellation condition when the measured total temperature is situated outside of said temperature range DB, and which transmits, if appropriate, this information to an auxiliary unit 25 via a link 26.

This auxiliary unit 25 also receives the incorrect measurement detection information via the link 7, and it transmits via a link 27 to user means:

an item of information of detection of an incorrect measurement (when it is informed of such a detection via the link 7), so that the measurement is considered to be invalid from that moment onwards and is no longer taken into account; and, after a detection of an incorrect measurement, an item of information of cancellation of detection (when it is informed of such a cancellation via the link 26), so that the measurement is then again considered as valid and can again be taken into account.

Thus, when icing is detected by the detection unit 5, the device 1 continues to monitor the measured total temperature (via the monitoring unit U5) in order to check if the probe has been deiced or not. For this purpose, the monitoring unit U5 checks if the total temperature is outside of a range of uncertainty DB (preferably defined as between −10° C. and 1° C.), over a confirmation period of time T2 for example of 180 seconds. In fact, if the measured temperature is situated outside of this range DB, this signifies that the probe has been deiced.

For this purpose, the monitoring unit U5 can also check that one of the following two conditions is met:

the measured total temperature is lower than −10° C. (or than another predetermined negative temperature) over a period of time T2A; and, the measured total temperature is higher than 1° C. (or than another predetermined positive temperature) over a period of time T2B which is different from T2A, one of these two periods of time being able to correspond to 180 seconds.

The device 1 as described above therefore operates as follows:

it receives the current values, respectively, of the total temperature measured by a temperature probe, of the Mach number and of the altitude of the aircraft AC;

it monitors in real time the current values thus received, by the intermediary of the monitoring units U1 to U4; and, when said monitoring units U1 to U4 simultaneously indicate that the different conditions are met, the detection unit 5 of the device 1 considers that an incorrect measurement of total temperature is detected, and the total temperature measured by the corresponding temperature probe is no longer used because of icing.

Moreover, when such icing is detected by the detection unit 5, the device 1 continues to monitor the measured total temperature (via the monitoring unit U5) in order to be able to detect a situation of deicing of the temperature probe, again allowing the use of the measured temperature.

The device 1 notably has the following additional advantages:

no modification or addition of hardware items is necessary for its use;

it can be fitted easily on existing aircraft in usual architectures, as shown below with reference to FIG. 2 by way of example; and, it has low cost.

The present invention can be applied to any system of the aircraft AC, notably to a computer of the aircraft AC, and in particular to a control computer of the EEC (Electronic Engine Control) type or to an air data inertial reference system of the ADC (Air Data Computer) type, which has access to current values (that is to say that it receives and/or determines them) and this is simultaneously so for the total temperature, the Mach number and the altitude of the aircraft AC, this system comprising at least one device 1 for automatically detecting an incorrect total temperature, such as described above.

In a particular embodiment, this system 30 is an engine control system of the EIF (Engine Interface Function) type.

Figure 2:
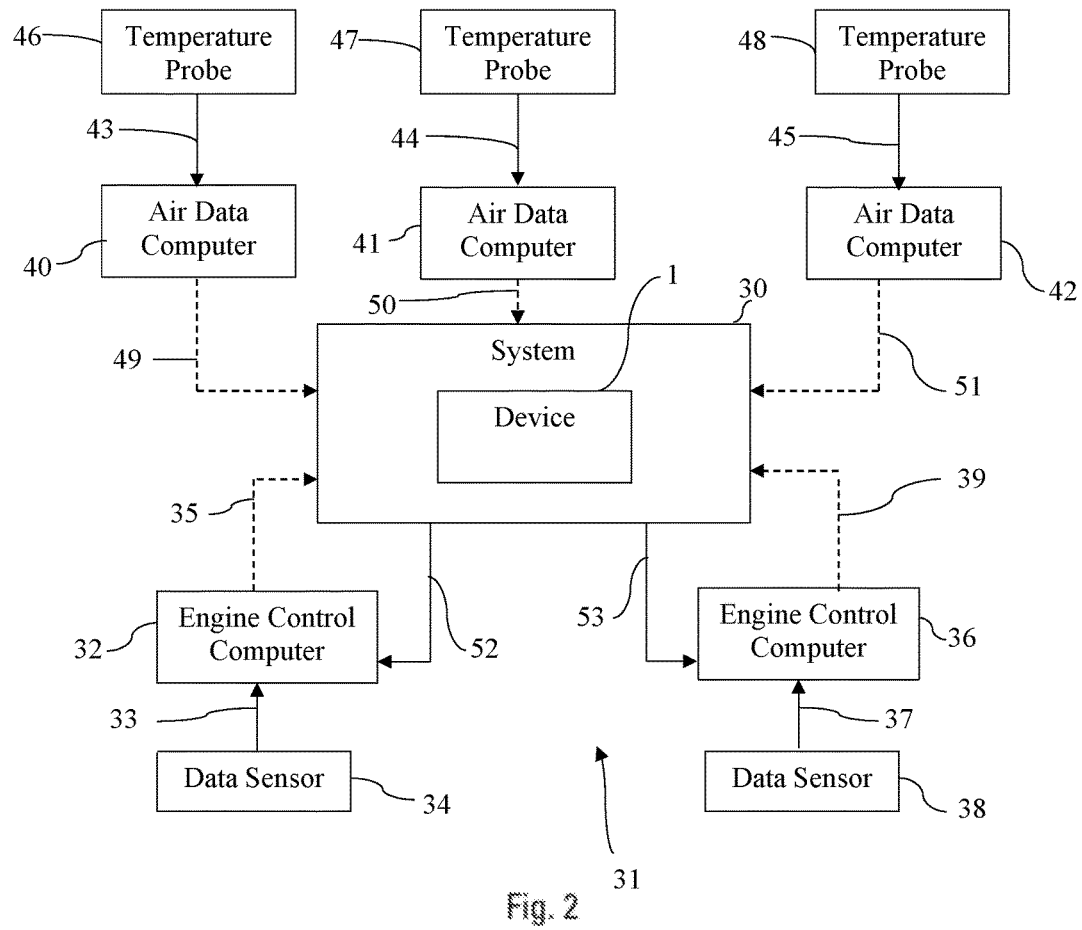
FIG. 2 is the block diagram of an engine control system to which the present invention can be applied.

This system 30 is part of the particular architecture 31 as shown in FIG. 2, which is intended for a twin engine aircraft in this example.

This architecture 31 comprises:

an engine control computer 32, of the EEC (Electronic Engine Control) type, which is associated with a first engine of the aircraft and which is connected (as illustrated by a link 33) to a set 34 of air data sensors, comprising at least one usual temperature probe able to measure the total temperature, and which provides information (and notably the total temperature TAT measured by at least one temperature probe of the set 34) to said system 30 via a link 35;

an engine control computer 36, of the EEC (Electronic Engine Control) type, which is associated with a second engine of the aircraft and which is connected (as illustrated by a link 37) to a set 38 of air data sensors, comprising at least one usual temperature probe able to measure the total temperature, and which provides information (and notably the total temperature TAT measured by at least one temperature probe of the set 38) to said system 30 via a link 39; and, a plurality of air data computers 40, 41 and 42 of the ADC (Air Data Computer) type, preferably all of the computers of this type of the aircraft. Each of said computers 40, 41 and 42 is connected (as illustrated by the links 43, 44 and 45) to a set 46, 47, 48 of air data sensors, comprising at least one usual temperature probe able to measure the total temperature, and it provides information (and notably the total temperature TAT measured by at least one temperature probe of the set 46, 47, 48) to said system 30 via a link 49, 50, 51.

The air data sensors of the aircraft and of the engines therefore measure the total temperature and send the air data information items to the respective computers 32, 36, 40, 41, 42 which transmit them to the system 30.

The system 30 selects, from the total temperatures thus received, a total temperature which it transmits to the engine control computers 32 and 36 by the intermediary of links 52 and 53 for the usual calculation of thrust control parameters.

The device 1 is installed in the system 30, and it monitors the total temperatures entering via the links 35, 39, 49, 50 and 51.

If icing is detected by the device 1, the corresponding temperature measurement is declared invalid and it is not used by the system 30.

The temperature selected in the usual manner by the system 30 (which does not therefore take account of the temperatures declared invalid) is then supplied to the control computers 32 and 36 for the calculation of thrust control parameters. The latter do not therefore make use of incorrect measurements.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed:

1. A method for the automatic detection of an incorrect measurement of a total temperature provided on an aircraft, wherein it comprises at least the following automatic steps, implemented repetitively:

monitoring a measured total temperature, provided by a temperature probe of the aircraft, in order to be able to detect a first condition according to which an increase of said measured total temperature is greater than a predetermined threshold temperature over at least a first predetermined period of time;

monitoring the measured total temperature, provided by the temperature probe, in order to be able to detect a second condition according to which said total temperature at an end of an increase is situated within a first temperature range around 0° C.;

monitoring a received current altitude of the aircraft, in order to be able to detect a third condition according to which any variation of said received current altitude over said first predetermined period of time remains below a predetermined altitude threshold;

monitoring a received current Mach number of the aircraft, in order to be able to detect a fourth condition according to which any variation of said received current Mach number over said first predetermined period of time, remains less than a predetermined Mach number threshold; and, detecting an incorrect measurement of the total temperature when said first, second, third, and fourth conditions are met simultaneously.

2. The method as claimed in claim 1, further comprising:
canceling a detection of an incorrect measurement of the total temperature by monitoring said measured total temperature, in the case of detection of an incorrect measurement, in order to be able to detect a cancellation condition according to which the total temperature is situated outside of a second temperature range around 0° C. over at least a predetermined second period of time.

3. The method as claimed in claim 2, wherein said second temperature range corresponds to said first temperature range.

4. The method as claimed in claim 1, wherein said first temperature range is included between −10° C. and 1° C.

5. The method as claimed in claim 1, wherein said predetermined temperature threshold is situated in a temperature range of between 8.5° C. and 11° C.

6. The method as claimed in claim 1, wherein said predetermined altitude threshold is situated in an altitude range of between 200 and 1000 feet.

7. The method as claimed in claim 1, wherein said predetermined Mach number threshold is situated in a Mach number range of between 0.02 and 0.2.

8. The method as claimed in claim 1, wherein said first predetermined period of time is equal to 60 seconds.

9. A device for automatically detecting an incorrect measured total temperature on an aircraft, the device comprising:

a first monitoring unit configured to automatically monitor a measured total temperature, provided by a temperature probe of the aircraft, in order to be able to detect a first condition according to which an increase of said measured total temperature is greater than a predetermined temperature threshold over at least a first predetermined period of time;

a second monitoring unit configured to automatically monitor said measured total temperature, provided by the temperature probe, in order to be able to detect a second condition according to which said total temperature at an end of an increase is situated within a first temperature range around 0° C.;

a third monitoring unit configured to automatically monitor a received current altitude of the aircraft, in order to be able to detect a third condition according to which any variation of said received current altitude during said first predetermined period of time remains below a predetermined altitude threshold;

a fourth monitoring unit configured to automatically monitor a received current Mach number of the aircraft, in order to be able to detect a fourth condition according to which any variation of said received current Mach number over said first predetermined period of time, remains below a predetermined Mach number threshold; and, a detection unit configured to automatically detect an incorrect measurement of the total temperature when said first, second, third, and fourth monitoring units simultaneously detect said first, second, third, and fourth conditions respectively.

10. The device as claimed in claim 9 further comprising:
an auxiliary monitoring unit configured to monitor said measured total temperature, in the case of detection of an incorrect measurement by said detection unit, in order to be able to detect a cancellation condition, according to which the total temperature is situated outside of a second temperature range around 0° C. over at least a second predetermined period of time.

11. An aircraft system having access to current values respectively of total temperature, of Mach number and of altitude of the aircraft, the aircraft system comprising:

at least one device for automatically detecting an incorrect measured total temperature, wherein the at least one device for automatically detecting an incorrect measured total temperature comprises:

a first monitoring unit configured to automatically monitor a measured total temperature, provided by a temperature probe of the aircraft, in order to be able to detect a first condition according to which an increase of said measured total temperature is greater than a predetermined temperature threshold over at least a first predetermined period of time;

a second monitoring unit configured to automatically monitor said measured total temperature, provided by the temperature probe, in order to be able to detect a second condition according to which said total temperature at an end of an increase is situated within a first temperature range around 0° C.;

a third monitoring unit configured to automatically monitor a received current altitude of the aircraft, in order to be able to detect a third condition according to which any variation of said received current altitude during said first predetermined period of time remains below a predetermined altitude threshold;

a fourth monitoring unit configured to automatically monitor a received current Mach number of the aircraft, in order to be able to detect a fourth condition according to which any variation of said received current Mach number over said first predetermined period of time, remains below a predetermined Mach number threshold; and, a detection unit configured to automatically detect an incorrect measurement of the total temperature when said first, second, third, and fourth monitoring units simultaneously detect said first, second, third, and fourth conditions respectively.

12. The aircraft system of claim 11 further comprising:
an aircraft.

* * * * *